United States Patent [19]
Deignan

[11] Patent Number: 5,465,090
[45] Date of Patent: Nov. 7, 1995

[54] KEY PAD SHIELDING DEVICE AND METHOD

[76] Inventor: Jeffrey J. Deignan, P.O. Box 2908, Kirkland, Wash. 98083

[21] Appl. No.: 250,029

[22] Filed: May 27, 1994

[51] Int. Cl.[6] .................................................. H04M 1/00
[52] U.S. Cl. .......................... 341/22; 341/20; 109/24.1; 109/49.5; 70/333 A; 361/680; 379/447; 379/451
[58] Field of Search ................................... 379/447, 450, 379/451, 437; 341/20, 22; 361/680; 109/24.1, 49.5; 70/331, 333 A, 446

[56] References Cited

U.S. PATENT DOCUMENTS

| | | | |
|---|---|---|---|
| 3,480,728 | 11/1969 | Chandler | 178/16 |
| 3,762,528 | 10/1973 | Garman | 197/105 |
| 4,032,931 | 6/1977 | Haker | 340/365 |
| 4,419,921 | 12/1983 | Simanski | 84/467 |
| 4,449,763 | 5/1984 | Barnett | 312/208 |
| 5,301,230 | 4/1994 | Barry | 379/447 |
| 5,353,349 | 10/1994 | Brown | 379/447 |

*Primary Examiner*—John K. Peng
*Assistant Examiner*—Daniel J. Wu
*Attorney, Agent, or Firm*—Dean A. Craine

[57] ABSTRACT

A touch pad shielding device for a pay telephone or ATM or similar device which requires a user to input information into a key pad. The shielding device includes a cover which is attached over the key pad on the device. Created beneath the cover is a cavity in which the user may insert his or her hand to manipulate the keys on the key pad. In one embodiment, the cover is pivotally attached over the key pad and includes a plurality of transversely aligned parallel slots. The slots are spaced apart so that viewing of the key pad is limited to the user standing in front of the key pad. In another embodiment, the cover is attached in a fixed position over the key pad and includes a plurality of, transversely aligned, pivoting slats to enable the user to adjust visibility of the key pad. Also provided herein is a method of privately inputting information into a key pad.

6 Claims, 1 Drawing Sheet

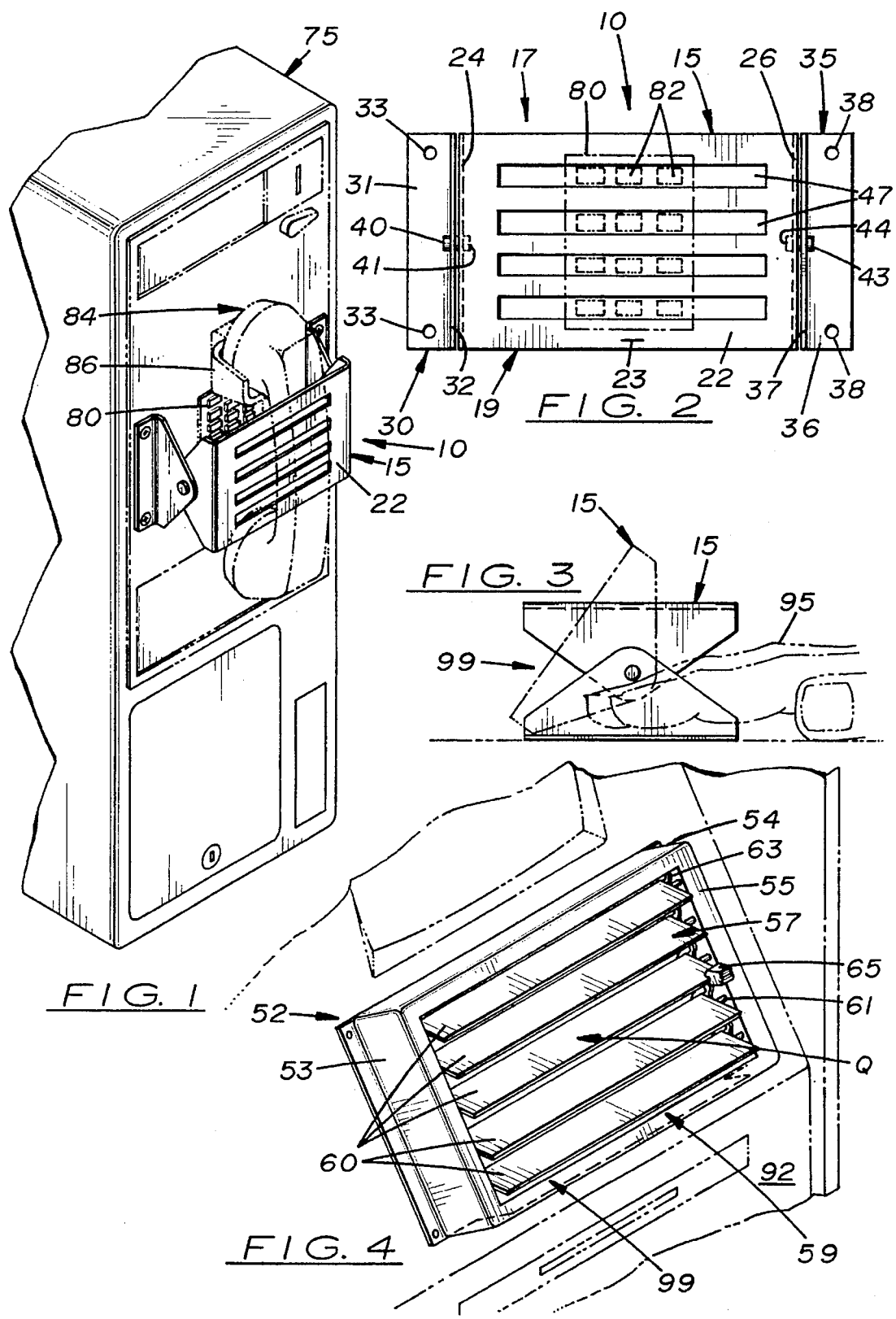

KEY PAD SHIELDING DEVICE AND METHOD

BACKGROUND OF THE INVENTION

1. Field of the Invention

The instant invention relates generally to security devices and more particularly to security devices used to prevent viewing of the inputting of information on a touch or key pad by other people.

2. Description of the Related Art

The users of pay telephones and bank automatic teller machines (ATMs) are required to input secret pass words or account numbers into a touch or key pad, hereinafter known as a key pad. Presently, users must position their bodies or hands in front of the key pad to prevent other individuals standing behind or adjacent to them from seeing which keys are selected. In many instances, blocking the view of other individuals may be difficult and socially awkward for the user.

SUMMARY OF THE INVENTION

A primary object of the present invention is to provide a shielding device so that the keys on a key pad on a pay telephone or ATM or similar device are only visible to the user and not to others positioned behind or adjacent to the user.

Another object is to provide such a shielding device which is adjustable for different size users.

A further object is to provide such a shield device which is easy to use and economical to manufacture.

To accomplish the above stated objectives and other objectives which will appear as this description proceeds, a key pad shielding device is disclosed comprising an adjustable or fixed cover that attaches over the key pad on a pay telephone or ATM device. The cover is designed to block the view of other individuals standing behind or adjacent to the user as keys on the key pad are selected. The cover, which forms a cavity over the key pad, has lower opening to enable a user to insert his or her hand therein to select keys on the key pad. In one embodiment, the cover has a plurality of horizontally, aligned, spaced apart slots formed thereon. The cover is pivotally mounted on opposite sides of the key pad so that it may be adjusted upward or downward for viewing the keys on the key pad when standing directly in front of the device. In another embodiment, the cover is fixed in position over the key pad and includes a plurality of adjustable slats which the user adjusts to view the keys on the key pad.

Also provided herein is a method of inputting information into a key pad.

BRIEF DESCRIPTION OF THE DRAWINGS

FIG. 1 is a perspective view of one embodiment of the key pad shielding device disclosed herein.

FIG. 2 is a top plan view of the key pad shielding device shown in FIG. 1.

FIG. 3 is a side elevational view of the key pad shielding device shown in FIGS. 1 and 2.

FIG. 4 is a perspective view of another embodiment of the key pad shielding device with a plurality of adjustable slats.

DESCRIPTION OF THE PREFERRED EMBODIMENT(S)

Turning now to the drawings, in which similar reference characters denote similar elements throughout, there is showing a key pad shielding device 10 attached over the key pad 80 on a device in which private information must be inputted. In FIG. 1 the device is a standard pay telephone 75, while in FIG. 4 the device is an ATM 92.

In the first embodiment, shown in FIGS. 1–3, the shielding device 10 comprises a two or three-sided cover 15 attached to the front surface of the pay telephone 75. The cover 15 includes a top face plate 22 which extends parallel directly over the key pad 80. Attached to front surface of the device 10 on opposite sides of the key pad 80 are two brackets 30, 35, respectively. As shown more clearly in FIG. 3, each bracket 30, 35 includes a mounting flange 31, 36 and integrally attached supporting flanges 32, 37, respectively, perpendicularly aligned thereto. The face plate 22 has a central, planar surface 23 and left and right flanges 24, 26 perpendicular thereto. During assembly, the left and right flanges 24, 26 are pivotally attached to the support flanges 32, 37, respectively, by pins 40 which extend through holes (not shown) formed on flanges 24, 26, 32 and 37. The outer extending edges of the flanges 24, 26, 32 and 37 are angled at approximately 45 degrees so that the face plate 22 may be selectively pivoted upward or downward approximately 90 degrees to a desired position by the user as shown in FIG. 3.

A bottom opening 19 is formed on the cover 15 thereby enabling the user to place his or her hand into a cavity 99 created thereunder to select various keys 82 on the key pad 80. The height of the flanges 24, 26, 32 and 37 must be sufficient so that the cavity 99 has sufficient height to enable the user to freely and comfortably extend and bend his or her fingers 95 during use. In the preferred embodiment, the width of the planar surface 23 on the face plate 22 is approximately 5 inches so that the first knuckle on the user's fingers are covered by the cover 15. In FIG. 1, the cover 15 fits over the handset 84 resting in the cradle 86. In this instance, the planar surface 23 is located approximately 4 inches above the key pad 80. In other embodiments not designed to fit over the handset 84, the planar surface may be disposed closer to the key pad 80, say approximately 3 inches.

Manufactured on the face plate 22 is an adjustable, view limiting means designed to limit the view of the keys 82 selected on the key pad 80 to someone standing in front of the key pad 80. In one embodiment, the adjustably view limiting means includes a plurality of transversely aligned, parallel slots 47 as shown in FIG. 2. The length of the slots 47 must be sufficient so that keys 82 aligned in one horizontal row on the key pad 80 may be viewed by the user. The width of the slots 47 also must be sufficiently limited so that only one horizontal row is seen. The slots 47 are spaced apart and located directly above the horizontal row of keys 82 so that the user may see all of the keys 80 in the horizontal row while standing in front of the cover 15. By pivotally adjusting the cover 15 over the key pad 80, the user is able to adjust the cover 16 to view of the keys 82 through the slots 47 and prevent unauthorized viewing by others standing behind or adjacent thereto. The number of slots 47 manufactured on the cover 15 depends on the size of the key pad 80 and the width of the individual slots 47.

FIG. 4 shows an alternative embodiment of the invention attached to the front surface of an ATM device 92. The alternative embodiment comprises a two or three sided cover 52 capable of being attached over the key pad 80. The cover 52 has a left side 53, a right side 54, and a top face plate 55 which are integrally attached together along their respective peripheral edges. A top opening 57 is formed in the face plate 55 in which a plurality of traversely aligned, parallel slats 60 are disposed. Slats 60 are pivotally attached to the left and right sides 53, 54 via pins 61 disposed in holes (not shown). Linkage 63 is disposed on the inside surface of the cover 52 which interconnects each slat 60 thereby enabling the user to adjust the angles of the slats 60 during use by moving the handle 65 upward or downward. In the preferred embodiment, each slat 60 is capable of being pivoted 30 degrees on each side of the perpendicularly aligned viewing axis (denoted "Q") to accommodate short and tall users. The number and size of slats 60 used depends upon the size of the key pad 80 and lighting conditions.

Using the above device, a method of privately inputting information into a key pad is also provided. The method includes the following steps:

(a) attaching a cover over the key pad, said cover capable of forming a cavity over said key pad and having a bottom opening thereto, said cover further including an adjustable view limiting means capable of limiting the visibility of said key pad only to a user positioned directly in front of said key pad;

(b) positioning the user in front of said key pad, and;

(c) adjusting said adjustable view limiting means to enable a user to view said key pad.

In compliance with the statute, the invention described herein has been described in language more or less specific as to structural features. It should be understood, however, the invention is not limited to the specific features shown, since the means and construction shown comprised only the preferred embodiments for putting the invention into effect. The invention is, therefore, claimed in any of its forms or modifications within the legitimate and valid scope of the amended claims, appropriately interpreted in accordance with the doctrine of equivalents.

I claim:

1. A key pad shielding device, comprising:

a. a cover capable of covering and forming a cavity over a key pad, said cover having a bottom opening capable of enabling a user to select keys on said key pad, and;

b. an adjustable, view limiting means attached to said cover enabling a user to selectively view said keys on said key pad and prevent viewing of said keys on said key pad by others positioned behind or adjacent thereto.

2. A key pad shielding device, as recited in claim 1, wherein said adjustable, view limiting means is said cover being pivotally attached to over said key pad enabling said cover to be pivoted upward and downward over said key pad, said cover having a plurality of transversely aligned, spaced apart, parallel slots formed therein, said slots capable of enabling the user to view said keys on said key pad.

3. A key pad shielding device, as recited in claim 2, wherein there are four slots formed on said cover.

4. A key pad shielding device, as recited in claim 1, wherein said adjustable, view limiting means is said cover being attached in a fixed position over said key pad and having a plurality of pivoting interconnected slats aligned transversely thereon, said slats capable of being adjusted in position to enable limited viewing of said key pad.

5. A key pad shielding device, comprising:

a. a cover pivotally attached over a key pad, said cover capable of covering and forming a cavity over said key pad, said cover having a bottom opening of sufficient size to enable a user to insert one hand to select keys on said key pad, and;

b. a plurality of transversely aligned, parallel slots formed on said cover, said slots being spaced apart so that the view of said keys on said key pad is limited to a user standing directly in front of said key pad.

6. A method of privately imputting information into a key pad, comprising the following steps:

(a) attaching a cover over the key pad, said cover capable of forming a cavity over said key pad and having a bottom opening thereto, said cover further including an adjustable view limiting means capable of limiting the visibility of said key pad only to a user positioned directly in front of said key pad;

(b) positioning the user in front of said key pad, and;

(c) adjusting said adjustable view limiting means so enable a user to view said key pad.

\* \* \* \* \*